July 19, 1966     R. J. FRANK     3,261,360
INTERLOCK HOSPITAL CHART HOLDER
Filed Feb. 27, 1964     2 Sheets-Sheet 1
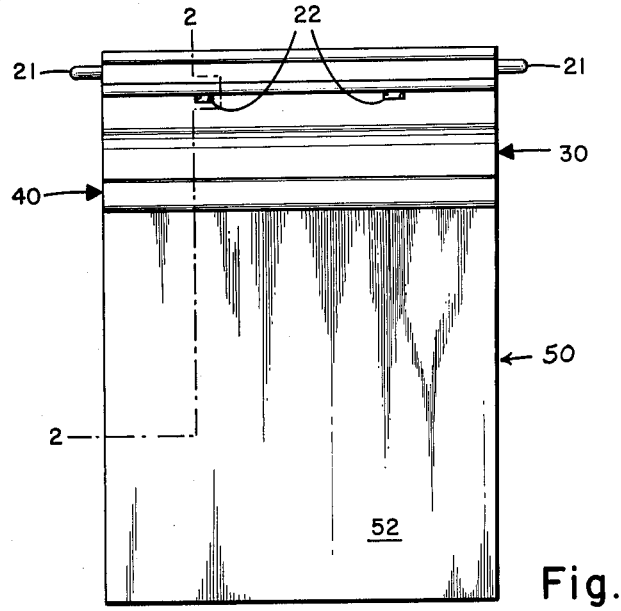
Fig. 1
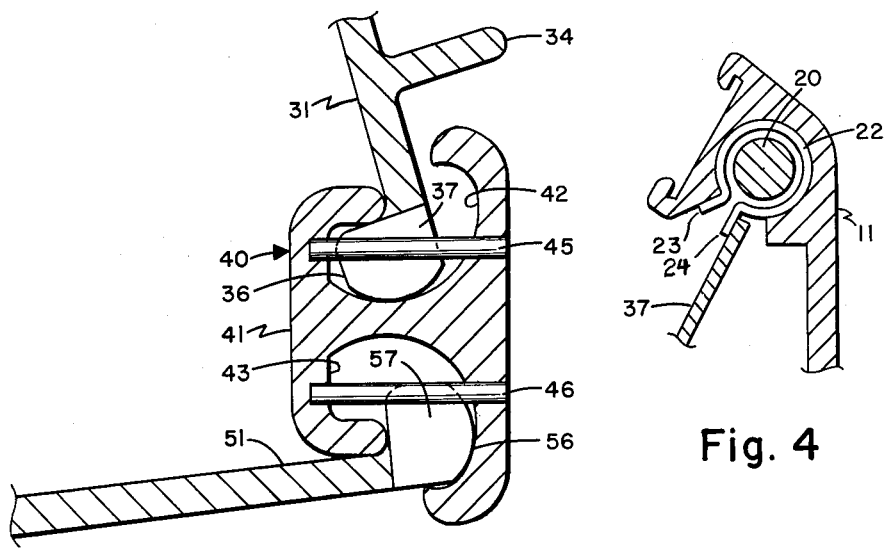
Fig. 5
Fig. 4
INVENTOR
RICHARD J. FRANK
BY Myron P. Laughlin
ATTORNEY July 19, 1966  R. J. FRANK  3,261,360
INTERLOCK HOSPITAL CHART HOLDER
Filed Feb. 27, 1964  2 Sheets-Sheet 2
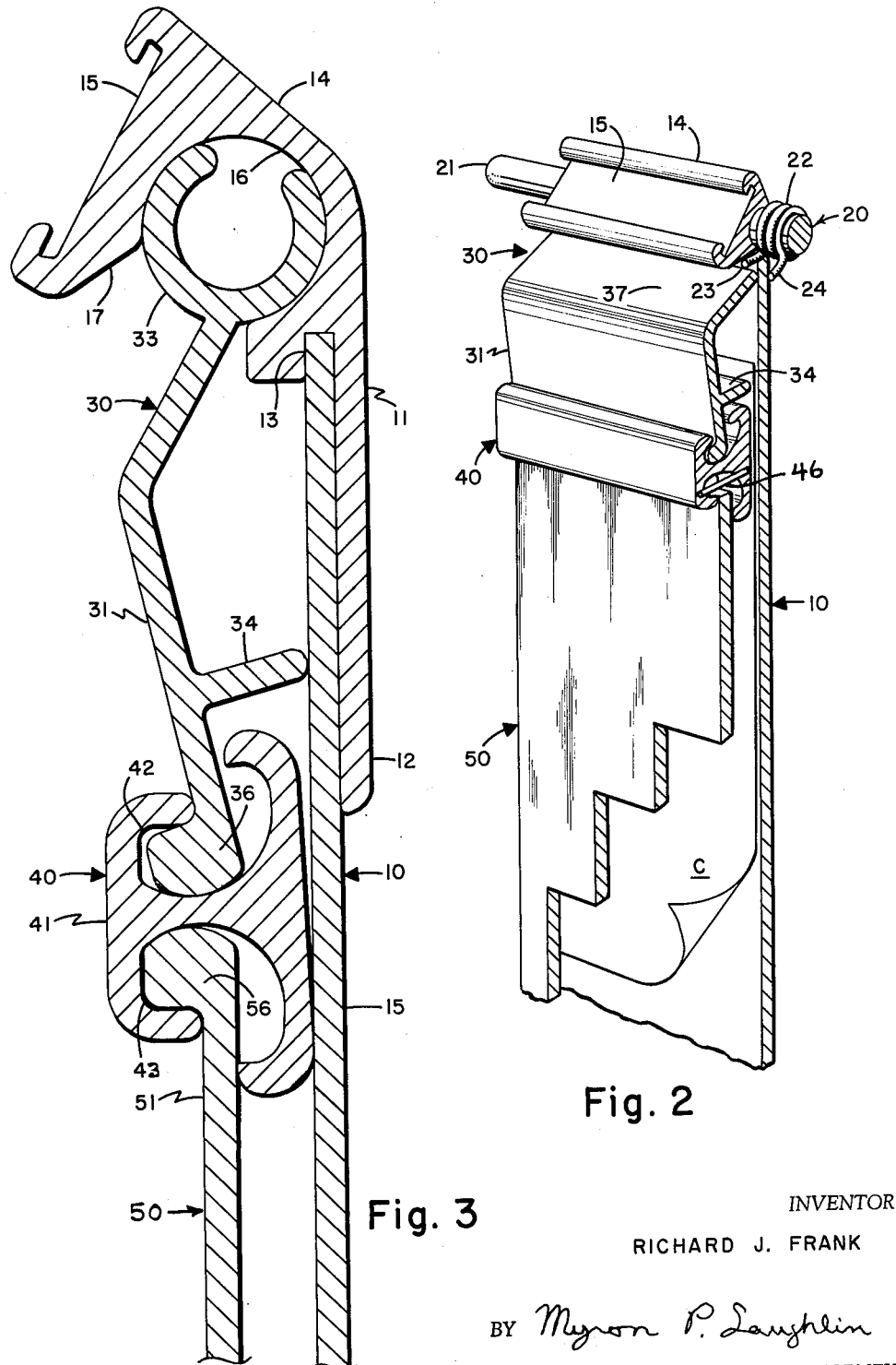
INVENTOR
RICHARD J. FRANK
BY Myron P. Laughlin
ATTORNEY

United States Patent Office 3,261,360
Patented July 19, 1966

3,261,360
INTERLOCK HOSPITAL CHART HOLDER
Richard J. Frank, 1372 39th Ave. NE.,
St. Petersburg, Fla.
Filed Feb. 27, 1964, Ser. No. 347,755
1 Claim. (Cl. 129—35)

The herein disclosed invention pertains to chart holders, and particularly those of the type employed in hospitals and clinics.

It is a purpose of this invention to provide a chart holder which will withstand the many abuses such holders are subjected to and which will have a minimum of physical parts and projections which can injure those handling the same and which will, at the same time, involve a mechanical structure subject to long wear and continued usefulness.

A patient's essential records must be always available to doctors and attendants, must be readily identifiable and must be capable of engaging such racks and supports as are necessary to file the same, but primarily it must positively grip and support the record charts which are to be retained therein, releasing the same when necessary. The prime purpose of this invention is to provide all of these necessary functions through interlocking metal parts which will provide positive clamping, rigid support, while at the same time, easy to keep clean and sufficiently strong to resist whatever abuse it may be subjected to.

It is a special purpose of this invention to provide a chart holder from metal extrusions so interlocking that a minimum of extra parts and attachments is involved and the use of the screws, bolts and rivets which formerly provided projections hazardous to health standards and sterile conditions, are eliminated, while a more substantial structure is provided.

The purposes of this invention may perhaps be best understood if the reasons for their importance are briefly outlined and the reasons which have so increased their importance that they have become an essential part of medical routine; and, like other medical equipment must be antiseptic, sanitary devices. Thus the purpose of this invention is to provide a sturdy, strong device overcoming the weaknesses and failures of former devices and eliminating many of the germ catching and physical hazard parts of such devices. A device which will provide doctor and nurse with a desk, with a safe place for the records, and with a positive holder from which the records are unlikely to be lost, while at the same time, readily removable for inspection and transfer.

Certain other improvements and advantages of my novel chart holder unit will appear as the appended description develops with reference to the attached drawings in which:

FIG. 1 is a front elevation of the complete chart holder having the general configuration required of such chart holders to fit hospital file requirements.

FIG. 2 is a prospective taken in section on line 2—2 of FIG. 1 and serves to illustrate the internal structure of the chart holder's upper part.

FIG. 3 is an enlarged cross-section showing the interrelationship of the various parts shown in FIGS. 1 and 2.

FIG. 4 is a detail of the construction of the upper hinged joint form employed in this invention.

FIG. 5 is a similar section of the lower hinged joint which I have invented.

Primarily my new construction utilizes a rear section which I have generally designated as 10, an upper frontal section which I have generally designated as 30 and a lower frontal section which I have generally designated as 50. Each of these portions or sections are in their main parts, metal extrusions which I have generally indicated as 11, 31 and 41. Parts 10, 30 and 50 are joined together by hinge members 20 and 40 interlocking the whole together and securing the parts as an operable unit without added elements.

The rear portion 10 is generally formed of a back sheet 12 preferably part of extruded member 11. Extruded member 11 also extends upward, as at 14 to form a channel 15 wherein the name card of a patient is commonly inserted for purposes of instant identification of records without opening the chart holder. Extrusion 11 also provides a channel or bore 16 which serves to seat and journal the top hinge part 33 of a second extrusion 31. Extrusion 31 also provides, as a part thereof, a clamp bar 34 which projects therefrom to press upon the back portion 10 and independently of other parts to clamp charts or papers C to the back 10 substantially as shown in FIG. 2. Extrusion 31 also has formed as an integral part thereof, an enlarged end bead 36 which slides into and interlocks with extrusion 41 forming the body of hinge 40. Extrusion 41 is formed with like horizontal channels 42 and 43 which form working seats for end bead 36 of extrusion 31 and 56 of extrusion 51. Extrusion 51 preferably extends to form front portion 50 of my chart holder and the front cover sheet 52, as is best seen in FIG. 3.

The construction of the upper hinged part of the chart holder as accomplished by the interlocking relationship of extrusions 11 and 31, is best understood by reference to FIGS. 2, 3 and 4, and to accomplish working interlock between the journalled parts 16 and 33, while providing the requisite spring closure of clamp 34, I also prefer to provide a pin 21 and vertical recesses in parts 16 and 33 wherein operate springs 22 (see FIGS. 1, 4 and 2) having ends 23 and 24 bearing upon the under side 17 of extrusion 11 and the upper side 37 of extrusion 31. This spring and pin construction secures the upper hinge of my chart structure together and the pin itself provides projections 21 to mount the chart holder between the usual filing ledges or rails of standard hospital chart holder frames.

Inspection of FIGS. 4 and 5 will show that arc of movement provided by my novel hinged portions is limited by the novel form of extrusion used; thus eliminating need for easily destructible hinge stops required in former chart structures. This portion of my invention also removes germ catching multiple recesses and elements heretofore thought unavoidable.

The various extrusions slide one within the other for assembly and are positively locked against disassociation by springs 22 held by pin 21 and, in the case of hinged channel 40, by horizontal pins 45 and 46 entering notched slots 47 and 57 cut in beads 36 and 56 after the fashion shown in FIGS. 2 and 5.

It will be seen that extrusion 11 includes rear portion sheet 12 but an extension thereof, as by sheet metal 15, may be appended by staking or like operation at 13 to supplement the extension if desired. Similar attachment may be made of cover sheet 52 to extrusion 51 to extend the front cover if desired.

Thus my whole structure, when assembled, provides a unit in which the lower portion of the front opens in a limited arc upon the journalled extrusions 51 and 31, and, as this observation cover is forced upward, springs 22 permit movement of 31 on 11 and portion 50 will hinge 31 upon rear portion 10 and lift bar 34 from 10, to release the chart papers C. It will be clear that since bar member 34 securely clamps the charts C upon the back member 10, no chart release function will be affected by opening of lower cover portion 50 for chart observation and that it is only after beads 36 and 56 have swung through limited, but not disengaging, arcs in member 40, that any pressure is exerted to lift member 30 to release the charts. Thus the charts will be held rigidly and securely at all times and irrespective of any movements of lower cover portion 50 or of independent hinge member 40. This positive clamping function is most important since a patient's records are of prime importance to his recovery and must be held securely while capable of instant observation and entries thereon without release thereof if desired.

Manifestly, a prime essential of such chart structures is simplicity and the present applicant believes he has accomplished novel and useful improvements in the art which he has defined in the appended claim.

I claim:

In a chart holder of the type used in hospitals to identify, secure and protect patient records, (a) A back element comprising a flat chart supporting section approximately the same size as said records and having integral therewith at its top and extending the full width thereof a name card holder, the lower surface between said card holder and chart supporting section comprising a hollow longitudinal cylindrical hinge recess, and (b) A clamping front element having its upper part in pivotal relationship within said cylindrical hinge recess, a pin fitted inside of said upper part, concentric with said cylindrical hinge recess and extending beyond the full width of said back element, and a clamp bar integral with said front element and parallel to said hinge recess, projecting from the rear surface of said front element and proportioned to press against said back element, an enlarged end bead along the lower edge of said front element, and (c) A coil spring fitted around said pin and abutting against said clamping front element to press said clamp bar against said back element, and (d) A hinge body proportioned to pivotally engage at its upper portion said end bead and having a lower recess parallel thereto, and (e) A front element having an enlarged end bead along the upper edge thereof, proportioned to fit within said lower recess and in pivoted engagement therewith and extending below to provide a flat cover sheet proportioned substantially to cover the said flat chart supporting section.

References Cited by the Examiner

UNITED STATES PATENTS

| 707,234 | 8/1902 | Jones | 129—37 |
| 799,314 | 9/1905 | Eddy | 129—37 |
| 1,532,527 | 4/1925 | Casto | 129—37 X |
| 1,717,801 | 6/1929 | Metcalf | 281—44 X |
| 2,713,531 | 7/1955 | Boone | 129—37 X |
| 2,731,941 | 1/1956 | Anderson | 129—37 X |
| 2,834,072 | 5/1958 | Miller | 160—235 X |
| 2,885,000 | 5/1959 | Merrill | 160—199 X |
| 2,985,174 | 5/1961 | Guth | 129—35 |

LOUIS O. MAASSEL, *Primary Examiner.*

JEROME SCHNALL, WALTER A. SCHEEL, *Examiners.*

CLYDE COUGHENOUR, *Assistant Examiner.*